(12) United States Patent
Norris et al.

(10) Patent No.: US 7,121,896 B2
(45) Date of Patent: Oct. 17, 2006

(54) DIGITAL SWITCHING CROSS-CONNECT MODULE

(75) Inventors: Jeffrey J. Norris, Bloomington, MN (US); Shari K. Kluempke, Burnsvlle, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 89 days.

(21) Appl. No.: 10/978,700

(22) Filed: Nov. 1, 2004

(65) Prior Publication Data

US 2005/0191881 A1    Sep. 1, 2005

Related U.S. Application Data

(63) Continuation of application No. 10/199,981, filed on Jul. 19, 2002, now Pat. No. 6,830,486.

(51) Int. Cl.
*H01R 24/04*    (2006.01)

(52) U.S. Cl. ....................... 439/668; 439/669

(58) Field of Classification Search ............. 200/51 R, 200/51.02, 51.05, 51.08, 51.09, 51.11, 51.12; 439/668–669, 660, 188
See application file for complete search history.

(56) References Cited

U.S. PATENT DOCUMENTS

| | | | |
|---|---|---|---|
| 3,573,716 A | 4/1971 | Garver |
| 3,852,700 A | 12/1974 | Haws |
| 3,989,343 A | 11/1976 | Lucius et al. |
| 4,073,563 A | 2/1978 | Bailey et al. |
| 4,274,691 A | 6/1981 | Abernethy et al. |
| 4,406,509 A | 9/1983 | Jagen |
| 4,541,036 A | 9/1985 | Landries et al. |
| 4,556,264 A | 12/1985 | Tanaka |
| 4,687,291 A | 8/1987 | Stape et al. |
| 4,698,025 A | 10/1987 | Silbernagel et al. |
| 4,749,968 A | 6/1988 | Burroughs |
| 4,768,961 A | 9/1988 | Lau |
| 4,815,104 A | 3/1989 | Williams et al. |
| 4,836,804 A | 6/1989 | London et al. |
| 4,971,571 A | 11/1990 | Puerner |
| 4,998,889 A | 3/1991 | Moly |
| 5,147,992 A | 9/1992 | Eriksen et al. |
| 5,214,673 A | 5/1993 | Morgenstern et al. |
| 5,233,501 A | 8/1993 | Allen et al. |
| 5,246,378 A | 9/1993 | Seiceanu |

(Continued)

FOREIGN PATENT DOCUMENTS

WO    WO 93/20600    10/1993

(Continued)

OTHER PUBLICATIONS

Fig. 1 of admitted prior art from application.

(Continued)

*Primary Examiner*—Michael C. Zarroli
(74) *Attorney, Agent, or Firm*—Merchant & Gould P.C.

(57) ABSTRACT

A cross-connect module is disclosed herein. The cross-connect module includes a housing having a front end and a rear end. The rear end includes a rear wall defining connector mounting openings. First and second switching jacks are positioned adjacent the front end of the housing. Rear connectors mount within the connector mounting openings. Cables electrically couple the rear connectors to the switching jacks. A tracer lamp circuit including a power connector and a pin jack are also provided. In depicted embodiments, the rear connectors, the pin jack and the power connector are secured to the rear wall of the housing by snap-fit connections. The depicted module also includes a front cover having structure for providing snap-fit connections with the switching devices.

16 Claims, 15 Drawing Sheets

U.S. PATENT DOCUMENTS

| | | |
|---|---|---|
| 5,295,859 A | 3/1994 | Kawai et al. |
| 5,348,491 A | 9/1994 | Louwagie et al. |
| 5,366,388 A | 11/1994 | Freeman et al. |
| 5,413,494 A | 5/1995 | Dewey et al. |
| 5,467,062 A | 11/1995 | Burroughs |
| 5,538,438 A | 7/1996 | Orlando |
| 5,577,924 A | 11/1996 | Louwagie |
| 5,913,701 A | 6/1999 | Olson et al. |
| 5,947,771 A | 9/1999 | Bethurum |
| 6,019,521 A | 2/2000 | Manning et al. |
| 6,045,378 A | 4/2000 | Follingstad |
| 6,132,259 A | 10/2000 | Chapman et al. |
| 6,241,562 B1 | 6/2001 | Benda et al. |
| 6,287,149 B1 | 9/2001 | Elkhatib et al. |
| 6,328,608 B1 | 12/2001 | Olson et al. |
| 6,352,444 B1 | 3/2002 | Yuzawa |
| 6,409,534 B1 | 6/2002 | Weisz-Margulescu |
| 6,450,829 B1 | 9/2002 | Weisz-Margulescu |
| 6,524,131 B1 | 2/2003 | Schmidt et al. |
| 6,533,616 B1 | 3/2003 | Johnsen et al. |
| 6,543,626 B1 | 4/2003 | Mendoza |
| 6,589,062 B1 | 7/2003 | Ogren et al. |
| 6,830,486 B1 | 12/2004 | Norris et al. |
| 6,830,487 B1 | 12/2004 | Kluempke |
| 2002/0076964 A1 | 6/2002 | Weisz-Margulescu |
| 2003/0013346 A1 | 1/2003 | Perrone et al. |
| 2004/0014365 A1 | 1/2004 | Norris et al. |

FOREIGN PATENT DOCUMENTS

| | | |
|---|---|---|
| WO | WO 94/08429 | 4/1994 |
| WO | WO 98/38703 | 9/1998 |
| WO | WO 00/30219 | 5/2000 |

OTHER PUBLICATIONS

Brochure, "Video Signal Distribution Products," *ADC Telecommunications*, pp. 47, (Oct. 1996).

Exhibit A: ADC Telecommunications illustrates 3 views of digital cross-connect module with switching device. (Date: This art was known of prior to filling the parent patent application (U.S. Appl. No. 10/199,981)).

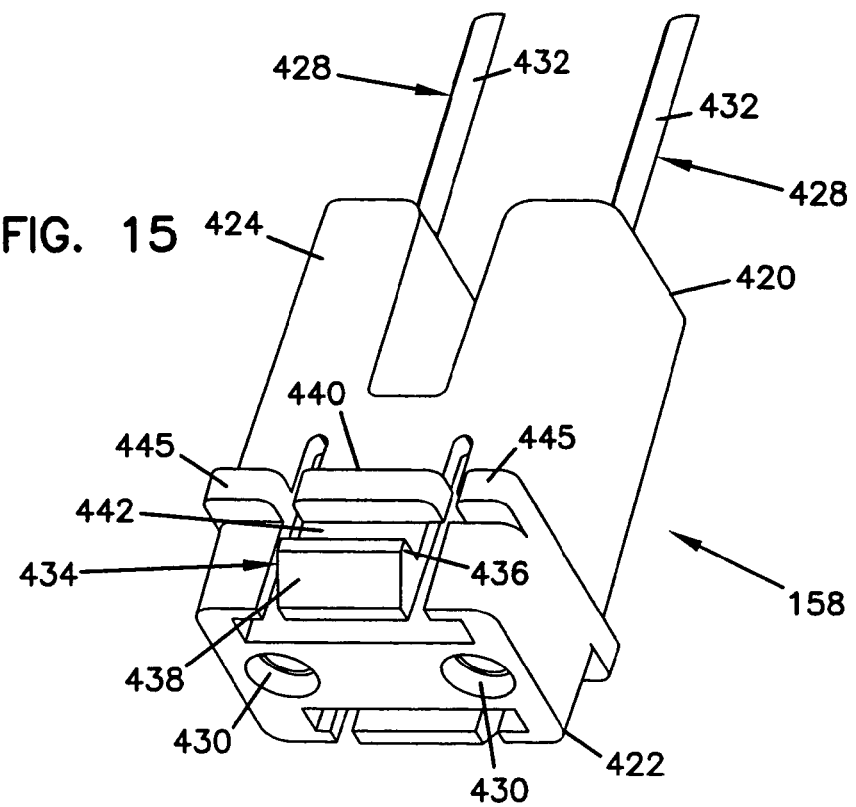
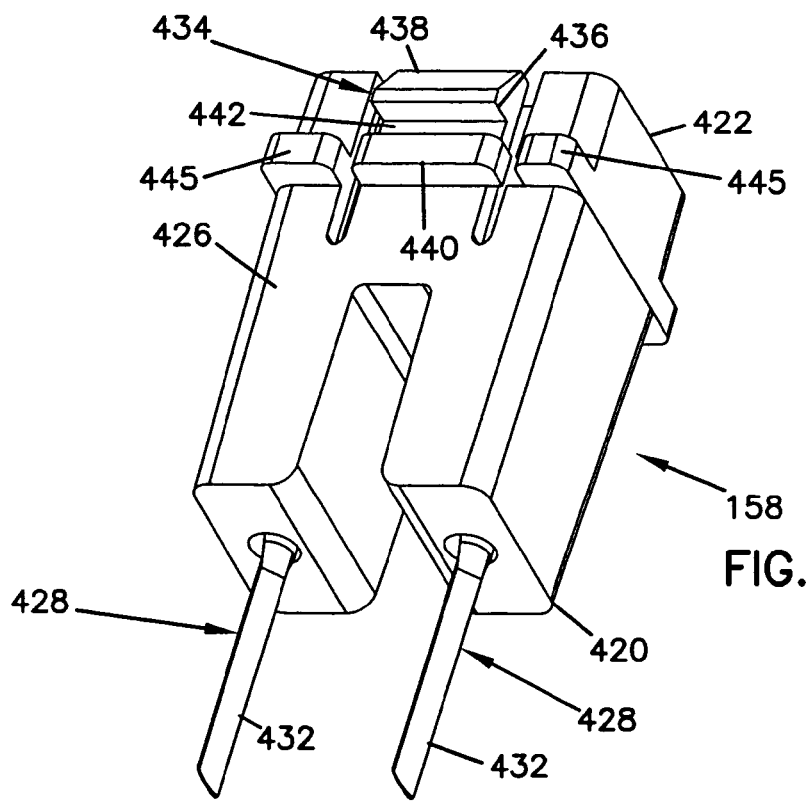

DIGITAL SWITCHING CROSS-CONNECT MODULE

CROSS-REFERENCE TO RELATED APPLICATIONS

This application is a continuation of U.S. patent application Ser. No. 10/199,981 filed on Jul. 19, 2002 now U.S. Pat. No. 6,830,486, which application is incorporated herein by reference.

FIELD OF THE INVENTION

The present invention relates generally to digital cross-connect equipment. More particularly, the present invention relates to cross-connect switching modules for use in telecommunications, data and video transmissions.

BACKGROUND OF THE INVENTION

In the telecommunications industry, the use of switching jacks to perform cross-connect and monitoring functions is well known. The jacks may be mounted to replaceable cards or modules which in turn may be mounted in a chassis, and multiple chassis may be mounted together in an equipment rack. Modules for use in co-axial environments are described in U.S. Pat. No. 5,913,701, which is incorporated herein by reference. Modules for use in twisted pair applications are described in U.S. Pat. No. 6,116,961. Cross-connect modules are also used with fiber optic communications systems.

FIG. 1 shows a prior art cross-connect arrangement of the type used for co-axial applications. The depicted arrangement includes two jack modules 20, 22. The jack modules 20, 22 may be mounted in separate chassis that are in turn mounted on separate racks. Each jack module 20, 22 is cabled to a separate network element (i.e., piece of telecommunications equipment). For example, jack module 20 is connected to equipment 24 by cables 26, and jack module 22 is connected to equipment 28 by cables 30. The pieces of equipment 24 and 28 are interconnected by cross-connect jumpers 32 placed between the two jack modules 20 and 22. Each jack module 20, 22 includes IN and OUT ports 34 and 36 for direct access to the equipment's input and output signals. Each module 20, 22 also includes X-IN and X-OUT ports 35, 37 for providing direct access to the cross-connect input and cross-connect output signals. Ports 34–37 provide a means to temporarily break the connection between the pieces of equipment 24 and 28 that are cross-connected together, and to allow access to the signals for test and patching operations. The jack modules 20, 22 also include monitor ports 38 for non-intrusive access to the input and output signals of each piece of telecommunications equipment 24, 28.

A typical telecommunications central office includes many jack modules and a large number of bundled cables interconnecting the modules. Consequently, absent indicators, it is difficult to quickly determine which two jack modules are cross-connected together. To assist in this function, the jack modules 20, 22 include indicator lights 40 wired to power 42 and ground 44. Switches 46 are positioned between the indicator lights 40 and ground 44. The indicator lights 40 are also electrically connected to pin jacks 48 located at the rear of the jack modules 20, 22. The pin jacks 48 provide connection locations for allowing the tracer lamp circuits corresponding to each of the modules 20, 22 to be interconnected by a cable 50. The cable 50 is typically bundled with the cross-connect cables 32. When either switch 46 is closed, the indicator lamps 40 corresponding to both of the jack modules 20, 22 are connected to ground and thereby illuminated. Thus, by closing one of the switches 46, the two jack modules 20, 22 that are cross-connected can be easily identified by merely locating the illuminated tracer lamps.

SUMMARY

The present disclosure describes representative embodiments that include examples of how a number of different inventive concepts can be practiced. It will be appreciated that the inventions can be used together or separately from one another. It will further be appreciated that the examples embodying the inventive concepts are merely illustrative, and that variations can be made with respect to the depicted examples without departing from the broad scope of the inventive concepts.

An example embodiment disclosed herein relates to a jack module having numerous inventive features for facilitating ease of assembly.

BRIEF DESCRIPTION OF THE DRAWINGS

The accompanying drawings, which are incorporated in and constitute a part of the specification, illustrate various embodiments that are examples of how certain inventions can be put into practice. A brief description of the drawings is as follows:

FIG. 15 is a perspective view of a pin jack of the jack module of FIG. 2;

FIG. 16 is a perspective view of the opposite end of the pin jack of FIG. 15;

DETAILED DESCRIPTION

Figure 1:
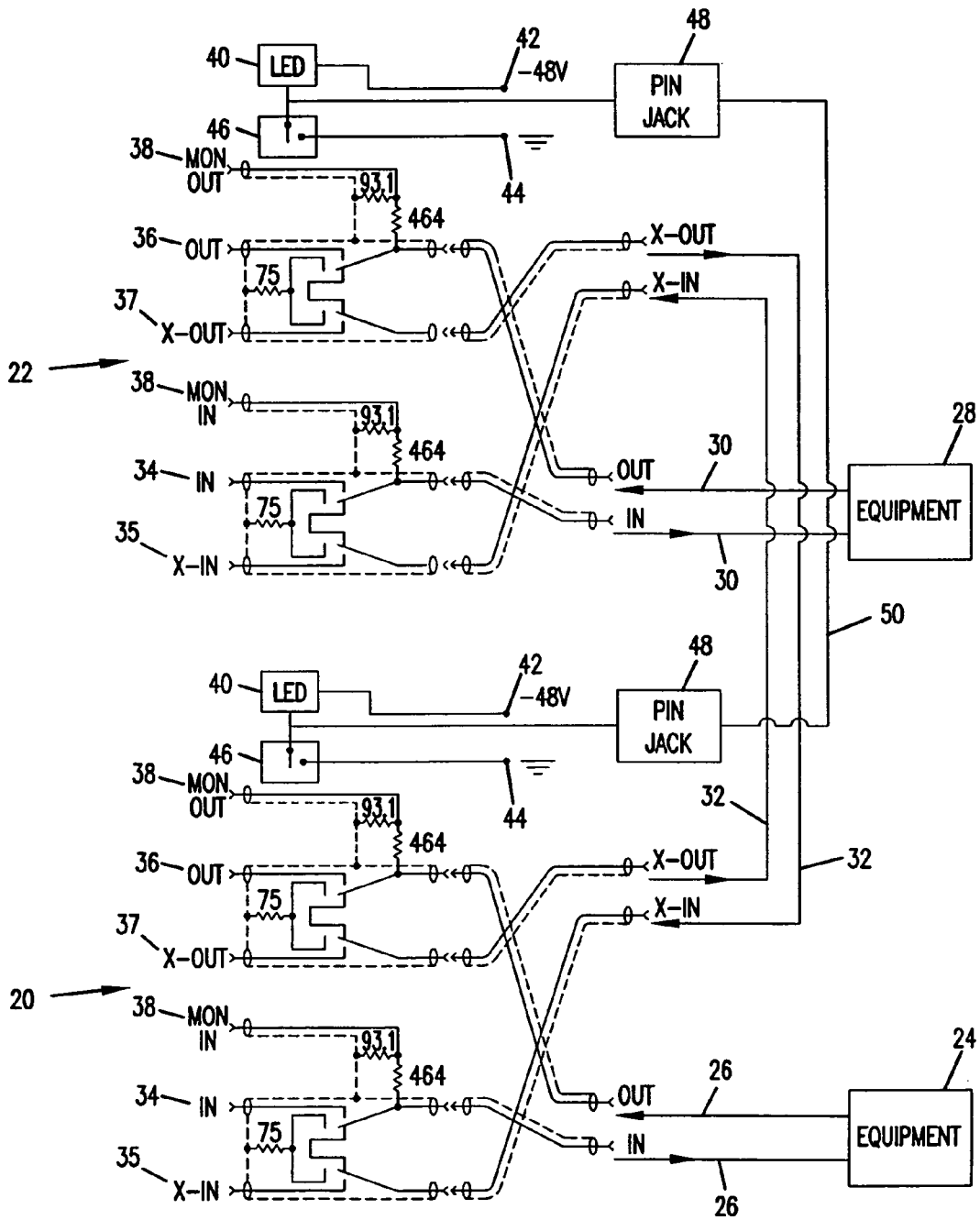
FIG. 1 shows a prior art cross-connect arrangement of the type used for co-axial applications.
Figure 2:
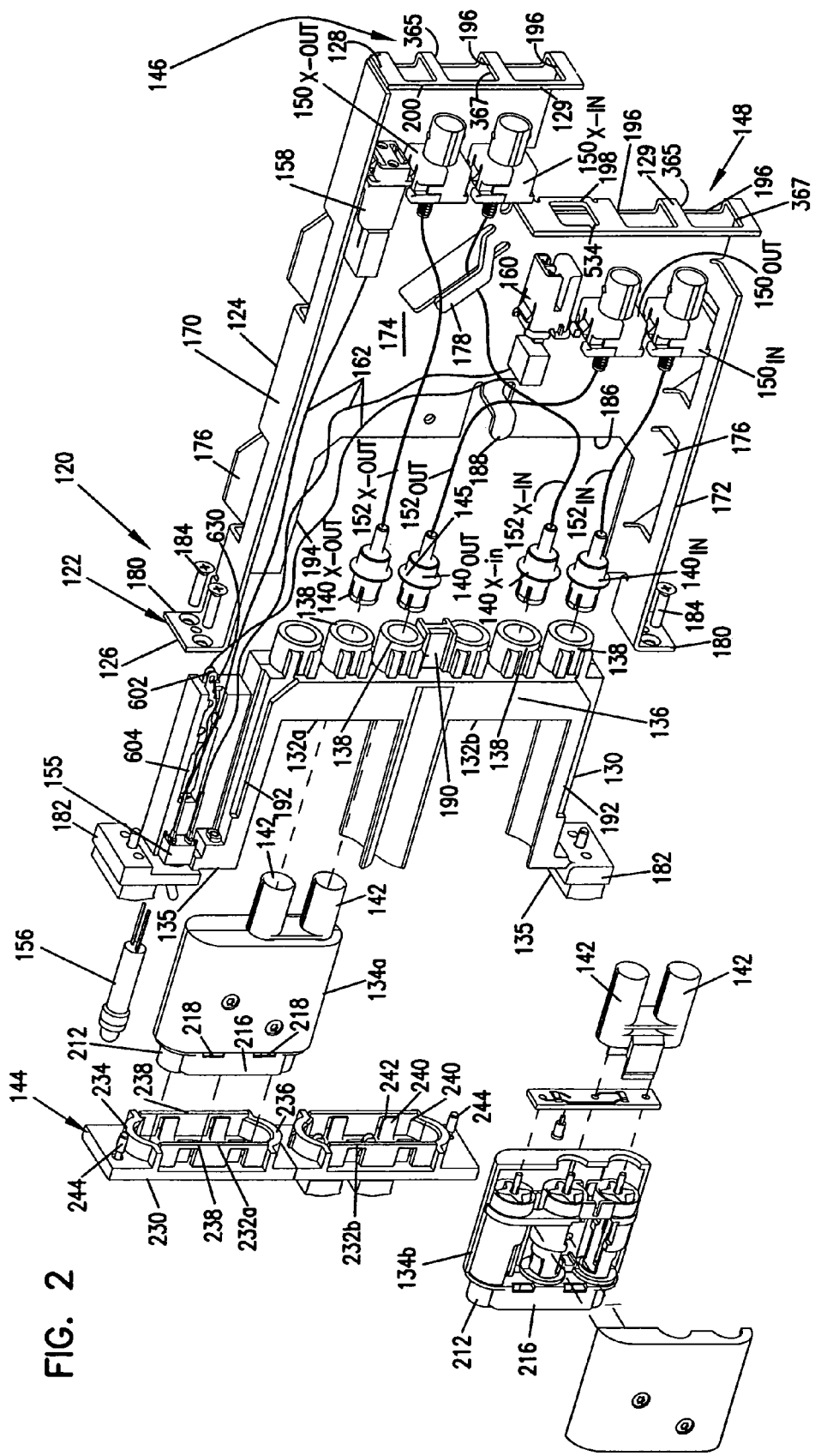
FIG. 2 illustrates a cross-connect module including examples of how numerous inventive concepts can be practiced.

FIG. 2 illustrates a jack module 120 including examples of how numerous inventive concepts can be practiced. The jack module 120 includes a housing 122 having a main frame 124. The main frame 124 includes a front end 126 positioned opposite from a rear end 128. A front jack mount 130 is mounted at the front end 126 of the main frame 124. The front jack mount 130 includes pockets 132a, 132b for respectively receiving jack devices 134a, 134b. Front ends of the pockets 132a, 132b are open, and back ends of the pockets 132a, 132b are closed by a rear wall 136 of the front jack mount 130. Connector mounts 138 are defined within the rear wall 136. The connector mounts 138 are adapted for receiving jack interface connectors 140IN, 140OUT, 140X-IN, 140X-OUT (collectively referred to with reference number 140). When the jack devices 134a, 134b are inserted within the pockets 132a, 132b, connectors 142 corresponding to the jack devices 134a, 134b interconnect with the jack interface connectors 140. The front side of the front jack mount 130 is enclosed by a removable front cover 144.

Referring still to FIG. 2, the rear end 128 of the main frame 124 includes a rear wall 129 having upper and lower connector mounting locations 146, 148. The lower mounting location 148 is inset relative to the upper mounting location 146. Rear connectors 150X-OUT, 150X-IN, 150OUT and 150IN (collectively referred to with reference number 150) are mounted at the rear end 128. For example, connectors 150X-OUT and 150X-IN are mounted at the upper mounting location 146, and connectors 150OUT and 150IN are mounted at the lower mounting location 148. Connectors 150X-OUT and 150X-IN are adapted for providing cross-connections between modules while the connectors 150OUT and 150IN are adapted for providing connections to network elements (e.g., telecommunications equipment). As shown in FIG. 2, cables 152X-OUT, 152X-IN, 152IN and 152OUT (collectively referred to with reference number 152) electrically connect the jack devices 134a, 134b to the rear connectors 150. For example, cable 152X-OUT connects connector 150X-OUT to connector 140X-OUT, cable 152X-IN connects connector 150X-IN to connector 140X-IN, cable 152OUT connects connector 150OUT to connector 140OUT, and cable 152IN connects connector 150IN to connector 140IN.

Referring still to FIG. 2, the jack module 120 is also preferably equipped with a tracer lamp circuit. The tracer lamp circuit includes a tracer lamp such as a light emitting diode (LED) 156 mounted at the front of the module 120. A tracer lamp switch 155 is positioned adjacent the LED 156. The tracer lamp circuit also includes a pin jack housing 158 mounted at the upper mounting location 146 and a card edge connector 160 mounted at the lower mounting location 148. A harness 162 electrically connects the card edge connector 160, the pin jack housing 158, and the switch 155 to the LED 156. It will be appreciated that the pin jack housing 158 is adapted for connecting the tracer lamp circuit to the tracer lamp circuit of a cross-connected jack module, and the card edge connector 160 is adapted for connecting the tracer lamp circuit 154 to power and ground.

I. Description of Example Module Frame

Referring to FIG. 2, the main frame 124 of the jack module 120 includes opposing top and bottom walls 170, 172. The walls 170, 172 are generally parallel and extend between the front and rear ends 126, 128 of the main frame 124. A side wall 174 interconnects the top and bottom walls 170, 172. Guides 176 project above and below the top and bottom walls 170, 172. The guides 176 are adapted for riding within tracks or grooves defined by a chassis (not shown) adapted to hold a plurality of the modules 120.

Referring still to FIG. 2, one or more cable management structures are provided at the side wall 174 of the jack module 120. The cable management structures are adapted for organizing cables in the region between the front jack mount 130 and the rear end 128 of the main frame 124. For example, a cable guide 178 (i.e., a finger or a cable retainer) is positioned adjacent the upper mounting location 146 for guiding cables to either or both of the connectors 150X-OUT and 150X-IN. Specifically, the cable guide 178 is shown in general horizontal alignment with the connector 150X-IN.

The front end 126 of the main frame 124 includes structure for mounting the front jack mount 130. For example, the front end 126 includes front flanges 180 that are fastened to corresponding flanges 182 of the front jack mount 130 by fasteners 184. The main frame 124 further includes an alignment tab 188 that is received within a corresponding channel 190 defined by the jack mount 130. In the depicted embodiment, the jack mount 130 is captured between the alignment tab 188 and the side wall 174.

Referring still to FIG. 2, the jack mount 130 includes inset shoulders 192 positioned above and below the pockets 132. In one embodiment, the inset shoulder 192 are adapted to receive edges of an optional cover plate. By insetting the cover plate relative to the jack mount 130, the overall thickness of the jack module can be reduced. It will also be appreciated that shoulders similar to the inset shoulders 192 can be provided on the back side of the jack mount 130 for receiving front edges 194 of the main frame 124. The edges 194 define a front cut-away region 186 of the frame 124. The shape of the cut-away region 186 preferably complements the shape of the inset shoulders provided on the back side of the jack mount 130.

The rear end 128 of the main frame 124 configured for mounting connectors thereon. For example, openings 196 are defined at the upper and lower mounting locations 146, 148 of the rear end 128 for mounting the connectors 150. Also, opening 198 is defined at the lower mounting location 148 for mounting the card edge connector 160. Moreover, opening 200 is defined at the upper mounting location 146 for mounting the pin jack housing 158. When the connectors are mounted in the openings, the connectors are accessible from the back side of the module.

In one non-limiting embodiment, the main frame 124 is made of a material such as sheet metal. Various structural features of the main frame 124 can be made by bending and/or punching the sheet metal. In this manner, the entire main frame 124 can be made from a single piece of material. It will be appreciated that other embodiments of the present invention can include materials other than sheet metal (e.g., plastic) and can be made from multiple pieces fastened or otherwise connected together.

The jack mount 130 is preferably made of a dielectric material such as molded plastic. However, other embodiments of the present invention can be made from other materials.

II. Switching Assemblies

Figure 3:
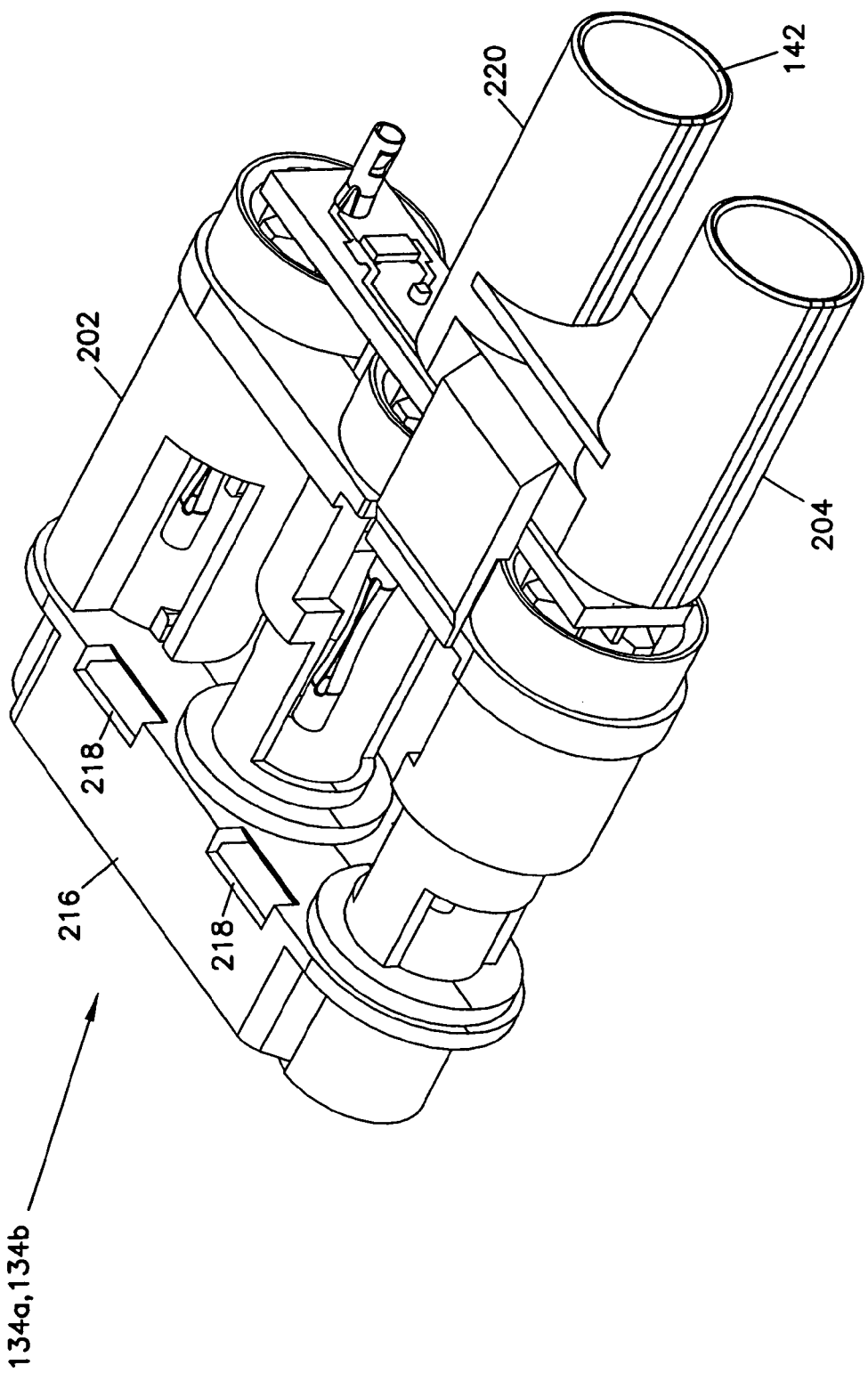
FIG. 3 is a rear perspective view of a switching jack of the module of FIG. 2.
Figure 4:
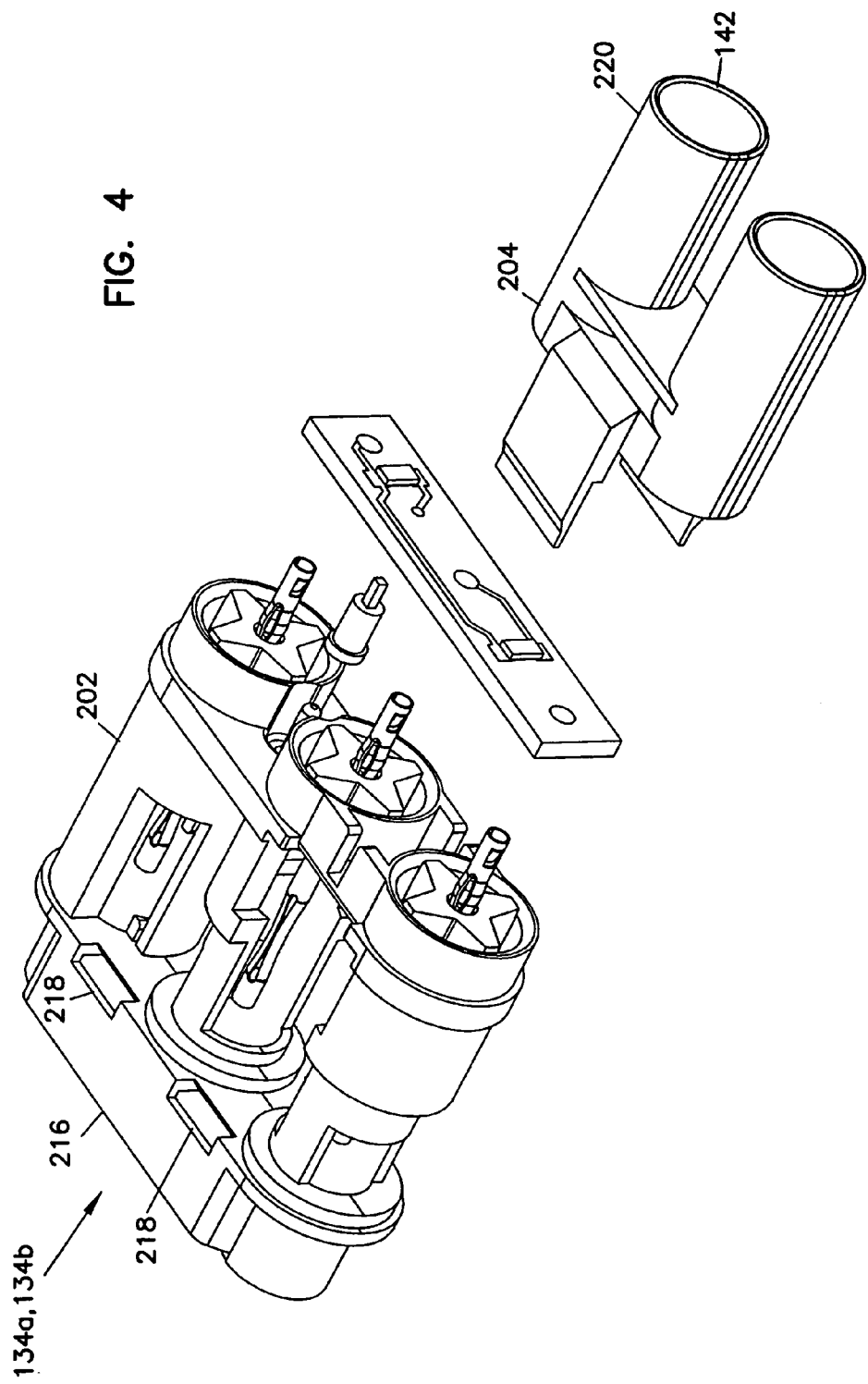
FIG. 4 is a rear, exploded view of the switching jack of FIG. 3.
Figure 5:
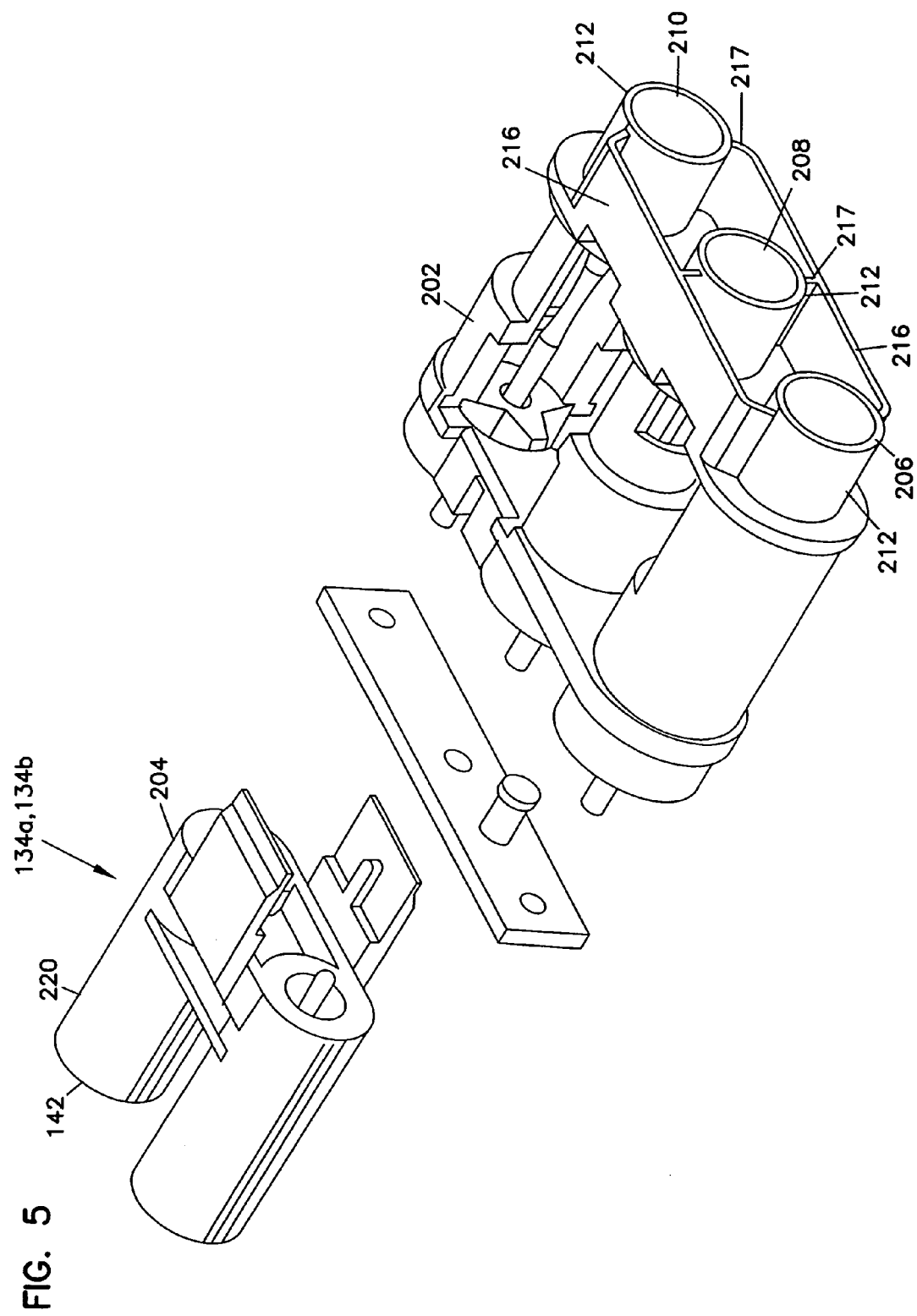
FIG. 5 is a front, exploded view of the switching jack of FIG. 3.

FIGS. 3–5 show one of the jack devices 134a, 134b in isolation from the jack module 120. Preferably, the two jack devices 134a, 134b have identical configurations to promote manufacturing efficiency. However, jacks of different configurations could also be used.

Referring to FIGS. 3–5, the depicted jack device 134a, 134b includes a front body 202 interconnected with a rear body 204. In a non-limiting embodiment, the front and rear bodies 202, 204 can be made of separate die cast metal pieces. The front body 202 includes front sleeves 212 that define a monitor port 206, a cross-connect access port 208 and an equipment access port 210. The front body 202 also includes a circuitry housing positioned between the sleeves 212 and the rear body 204 for housing switches and other circuit components. The rear body 204 includes sleeves 220 that define the connectors 142.

Referring to FIG. 5, the front body 202 also includes front side walls 216 positioned on opposite sides of the sleeves 212. The front side walls 216 are connected to the sleeves 212 by legs 217. As best shown in FIG. 4, notches 218 are defined by the side walls 216. The notches 218 are located adjacent rear edges of the side walls 216.

Figure 6:
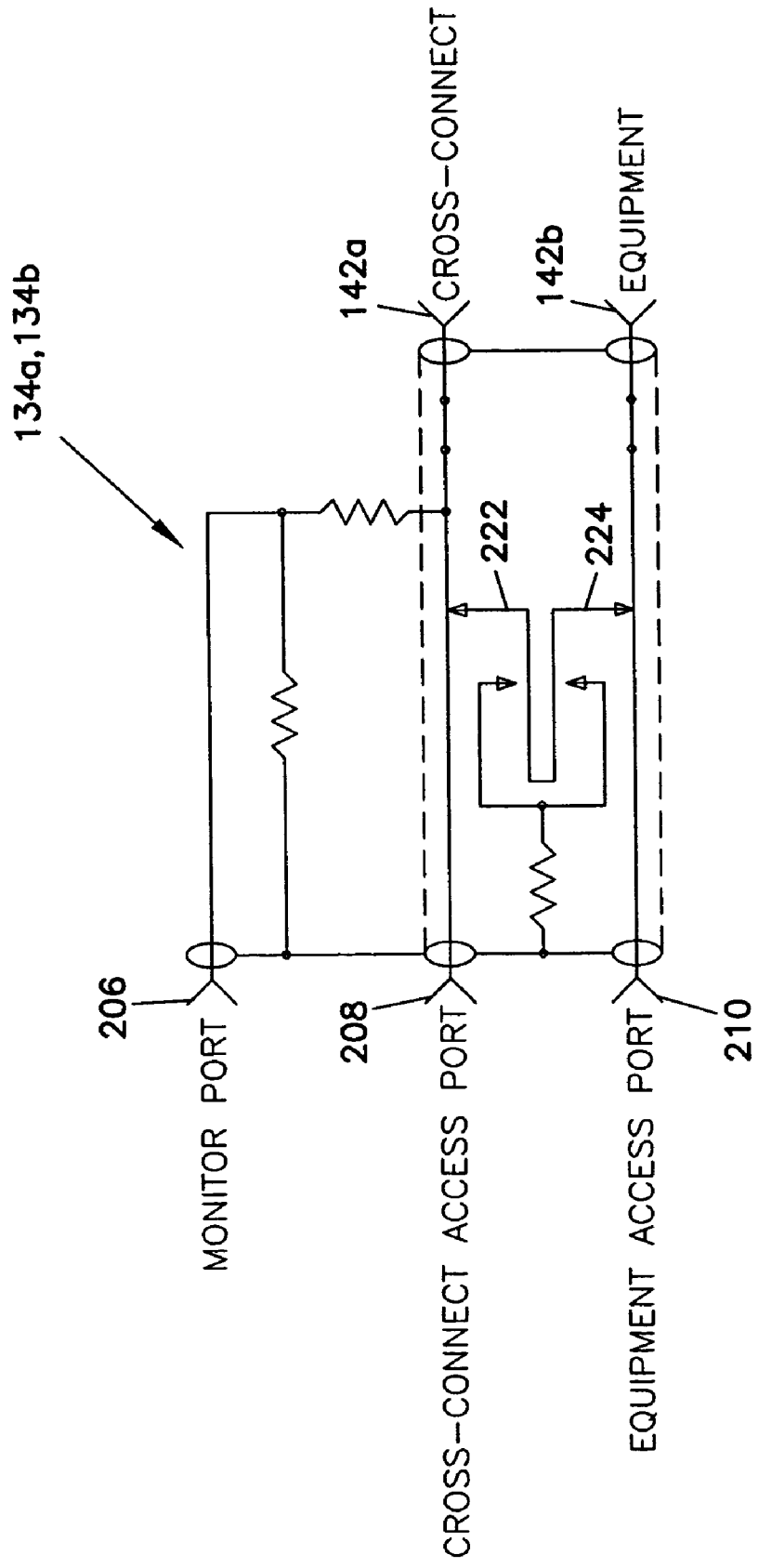
FIG. 6 is a schematic circuit diagram of the switching jack of FIG. 3.
Figure 7:
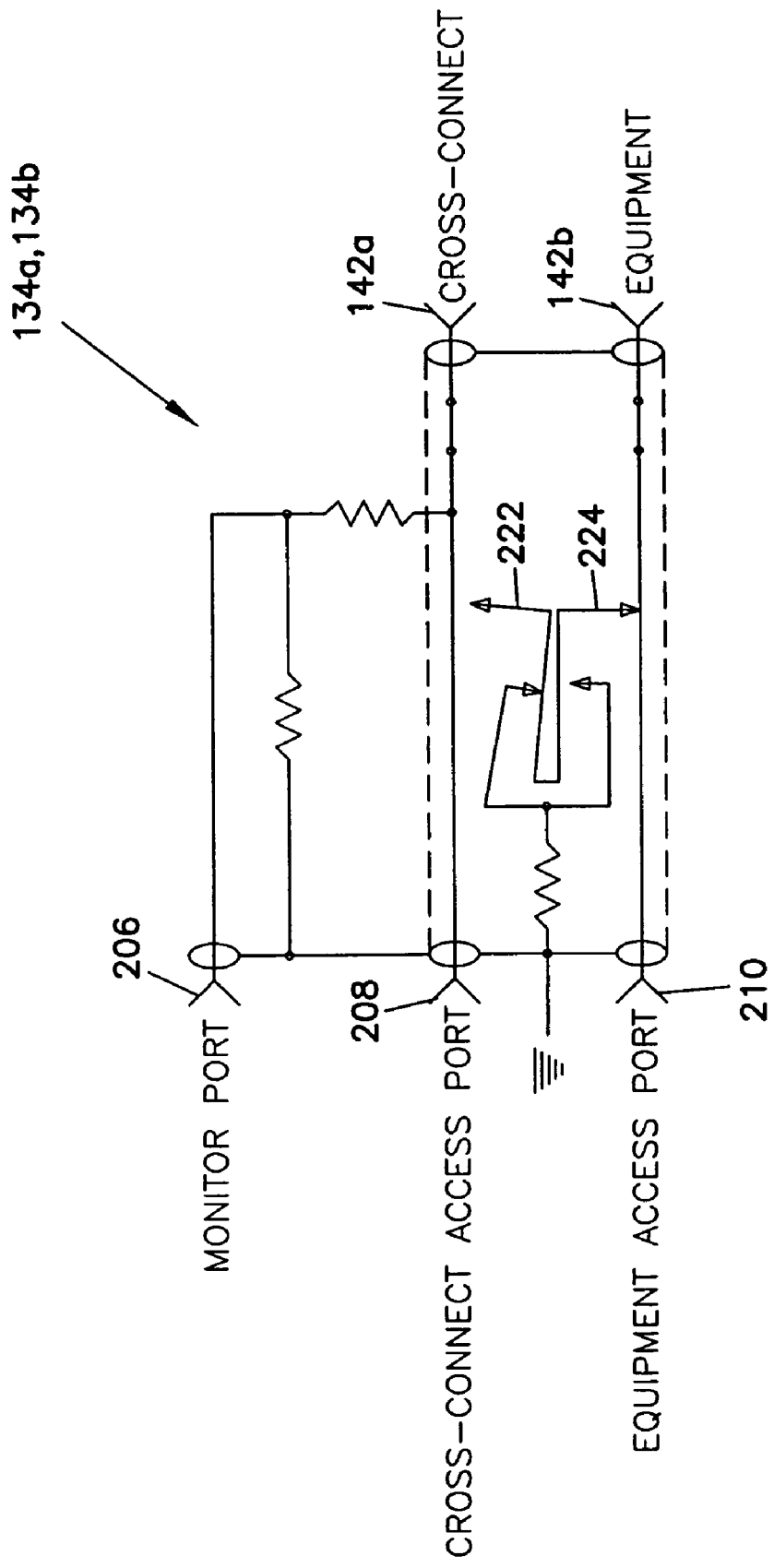
FIG. 7 illustrates the circuit diagram of FIG. 6 with a plug inserted within the cross-connect axis port.
Figure 8:
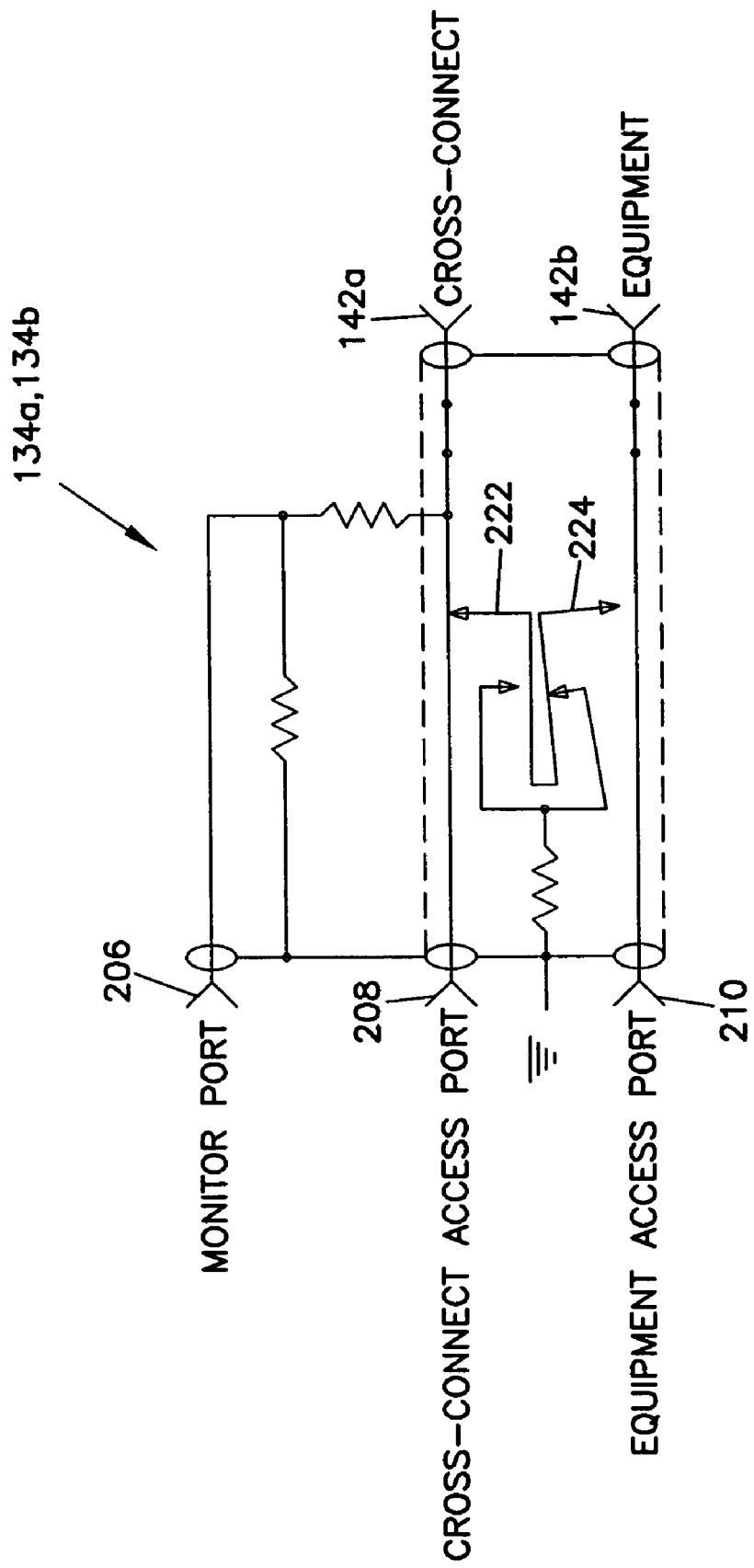
FIG. 8 illustrates the circuit diagram of FIG. 6 with a plug inserted within the equipment access port.

FIGS. 6–8 schematically show an exemplary circuit configuration for the jack devices 134a, 134b. When no plug is inserted within any of the ports 208, 210, connectors 142a and 142b are electrically connected by springs 222 and 224. When a plug is inserted into port 208 as shown in FIG. 7, the electrical connection between the connectors 142a and 142b is broken and a direct electrical connection is provided between port 208 and the connector 142a. Concurrently, the center pin of the connector 142b is grounded. When a plug inserted within port 210 as shown in FIG. 8, the electrical connection between connectors 142a and 142b is broken and a direct electrical connection is provided between port 210 and connector 142b. In this configuration, the center pin of the connector 142a is electrically connected to ground. The port 206 allows signals being transferred through the jack device to be non-intrusively monitored.

The jack devices are also disclosed in U.S. application Ser. No. 10/199,980 entitled Monitor Network for a Digital Switching Cross-Connect Module, which was filed on a date concurrent herewith, and which is hereby incorporated by reference in its entirety.

III. Front Cover

Referring back to FIG. 2, the front cover 144 of the jack module 120 includes a panel 230. As depicted, the panel 230 is generally rectangular. Elongated receptacles 232a and 232b are located at the back side of the panel 230. The elongated receptacles 232a, 232b each include top and bottom rounded nose pieces 234 and 236 that project rearwardly from the panel 230. The receptacles 232a, 232b are also defined by opposing and generally parallel side walls 238 that extend between the top and bottom rounded nose pieces 234, 236. The front cover 144 also includes resilient cantilever arms 240 located within the receptacles 232a, 232b. The arms 240 project rearwardly from the front panel 230 and are arranged generally parallel to the side walls 238. Preferably, a spacing equal to at least a thickness of the side walls 216 of the jack devices 134a, 134b exist between the arms 240 and the side walls 238. Retaining tabs 242 are located at the free ends of the arms 240. In one non-limiting embodiments, the front cover 144 is formed from a plastic material such as polycarbonate.

The cantilever arms 240 are adapted to provide a snap fit connection between the front cover 140 and the jack devices 134a, 134b. For example, the elongate receptacle 232a is adapted to receive the front end of the jack device 134a and the elongated receptacle 232b is adapted to receive the front end of the jack device 134b. With the two jack devices 134a, 134b inserted within the receptacles 232a, 232b, the side walls 216 of the jack devices are positioned between the side walls 238 and the cantilever arms 240. Preferably, the retaining tabs 242 of the arms 240 snap within the notches 218 of the jack devices 134a, 134b. The top and bottom rounded noses 234, 236 have curvatures that match the outer curvatures of the sleeves 212 of the monitor ports 206 and the equipment access ports 210.

In use, the jack devices 134a, 134b are snap fit within the receptacles 232a, 232b prior to mounting the front cover 144 to the housing 122. After the jack devices 134a, 134b have been snapped within the front cover 144, the entire assembly can be connected to the jack module 120. For example, the assembly can be oriented such that the jack devices 134a, 134b are simultaneously inserted within pockets 132a, 132b. After the jack devices 134a, 134b are inserted within their respective pockets 132a, 132b, the front cover 144 can be secured to the front jack mount 134 by fasteners 244. The front end of the jack mount 130 preferably includes top and bottom insets 135 for allowing the panel 230 of the cover 144 to mount flush with the remainder of the front jack mount 130. It will be appreciated that the receptacles 232a, 232b preferably extend completely through the panel 230 such that the ports 206, 208 and 210 can be accessed from the front of the jack module without requiring removal of the front cover 144.

As used herein, the phrase "snap-fit connection" means a connection provided by a resilient member that flexes or deforms past a retaining structure and moves to a locking or retaining position by the inherent flexibility or elasticity of the resilient member. In the above described embodiment, the arms 240 are flexed away from the side walls 238 by contact between the tabs 242 and the side walls 216 of the jack devices. When the jack devices are fully inserted within the elongate receptacles 232a, 232b, the retaining tabs 242 move or "snap" into the notches 218 by the inherent bias of the arms 240. In other embodiments, the tabs and openings can be reversed such that arms are provided on the jack deices and openings or other interlocking structures (e.g., bumps, shoulders or other retaining structures) provided on the front cover. The term snap-fit connection is not limited to resilient arms, but includes any structures (e.g., bumps, tabs, shoulders, etc.) that are deformed during insertion and move to a retaining position by the inherent elasticity of the structures.

IV. Coaxial Connectors

A. Jack Interface Connectors

Referring to FIG. 2, the jack interface connectors 140 are mounted within the connector mounts 138 of the front jack mount 130. The connector mounts 138 are integrally formed with the rear wall 136 of the jack mount 130, and have a sleeve-like configuration. The jack interface connectors 140 are preferably press fit or snap-fit within the connector mounts 138. As so mounted, flanges 145 of the connectors 140 abut against back sides of the connector mounts 138. In one embodiment, the connectors 140 can be pressed into the connector mounts 138 with manual pressure.

B. Rear Connectors

Figure 9:
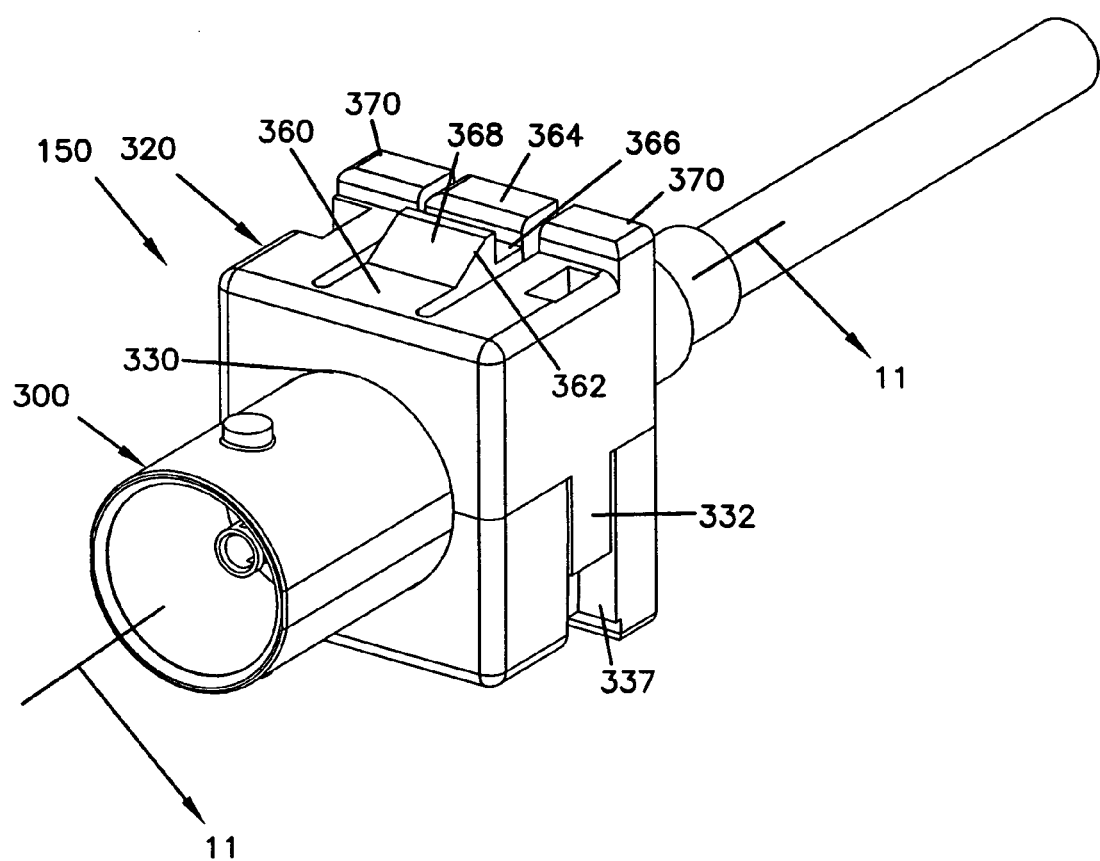
FIG. 9 is a perspective view of a rear connector of the jack module of FIG. 2.
Figure 10:
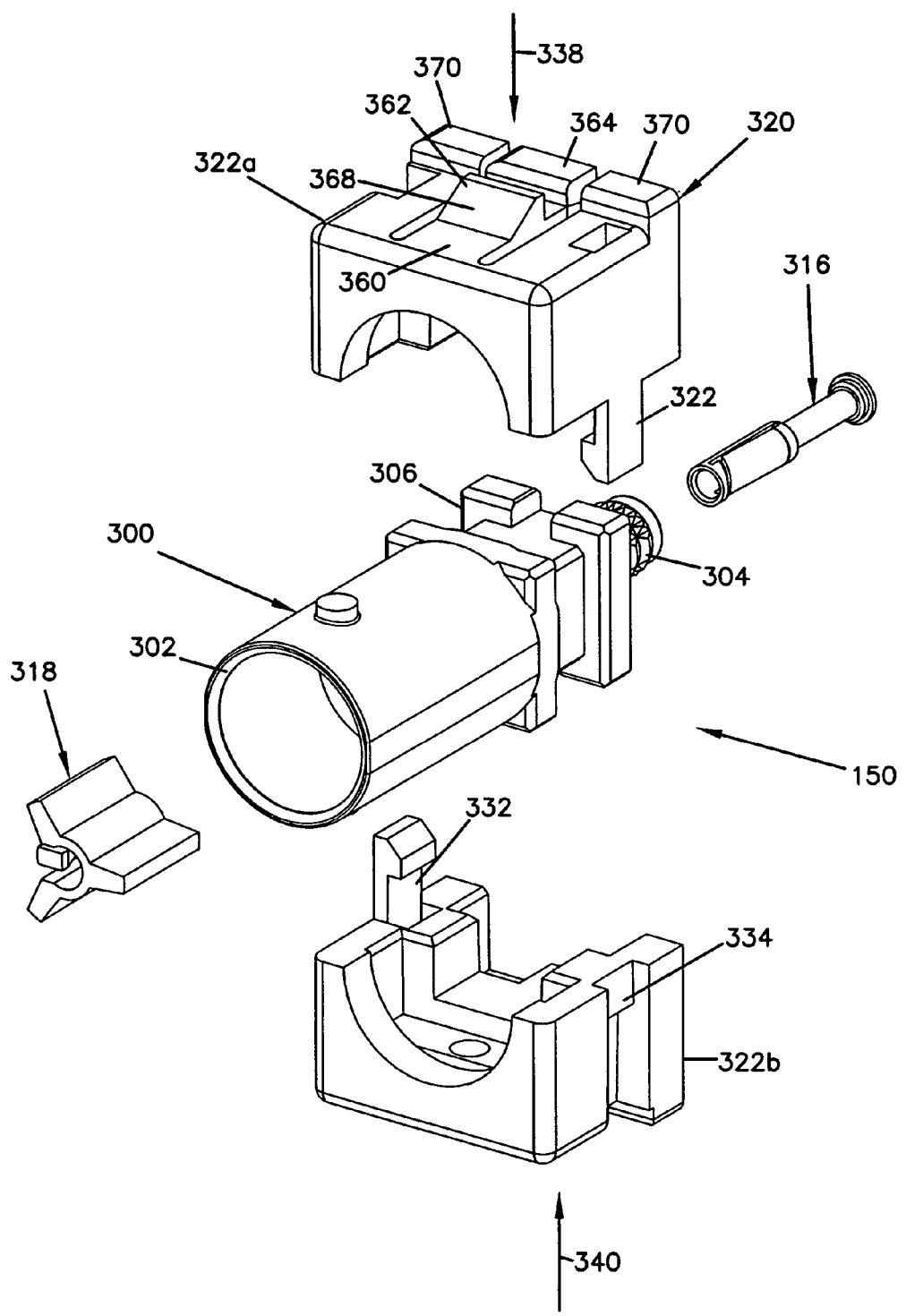
FIG. 10 is an exploded view of the rear connector of FIG. 9.
Figure 11:
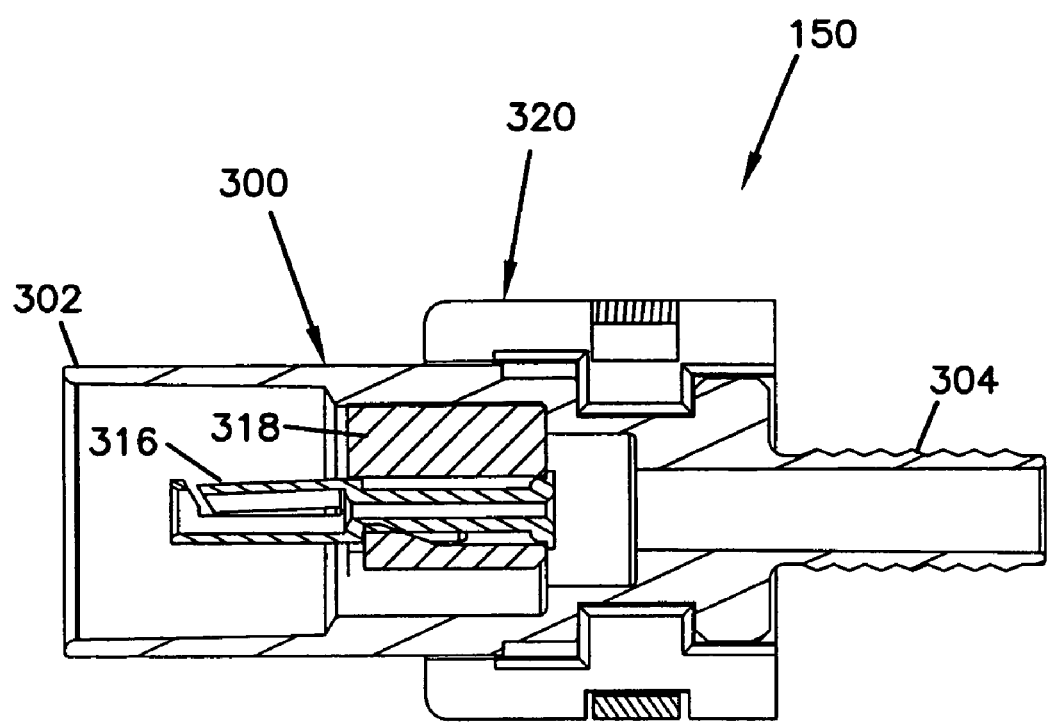
FIG. 11 is a cross-sectional view taken along section line 11—11 of FIG. 9.

FIGS. 9–11 illustrate one of the rear connectors 150 in isolation from the jack module 120. As best shown in FIG. 10, the rear connector 150 includes a bulkhead 300 and a housing 320 that mounts on the bulk head 300. The bulkhead 300 can also be referred to as a "connector body" or a "conductor holder." The connector 150 also includes a center conductor 316 and dielectric spacer 318 that mount within the bulkhead 300.

The bulkhead 300 of the connector 150 includes a connector sleeve 302 and a crimp supporting sleeve 304. The bulkhead 300 also includes a housing mount 306 positioned between the connector sleeve 302 and the crimp supporting sleeve 304. The center conductor 316 of the connector 150 preferably mounts within the connector sleeve 302. The dielectric spacer 318 is provided for centering the center conductor 316 within the connector sleeve 302. FIG. 11 shows the center conductor 316 mounted within the connector sleeve 302. In one embodiment, the bulkhead 300 is made of a material such as zinc die cast alloy. Of course, other materials could also be used.

Referring again to FIG. 10, the housing 320 of the connector 150 includes housing pieces 322*a* and 322*b*. To promote manufacturing efficiency, it is preferred for the housing pieces 322*a*, 322*b* to have identical configurations. However, in other embodiments the housing pieces could have different configurations. Further, in still other embodiments, more than two pieces could be provided. It is also contemplated that the housing piece could be manufactured as a single unitary piece formed about the bulkhead 300. The housing pieces 322*a*, 322*b* preferably have internal configurations that complement the outer configuration of the housing mount 306. In one embodiment, the housing 320 is made of a dielectric plastic material such as polycarbonate. In other embodiments, different materials can be used.

Referring still to FIG. 10, the housing pieces 322*a*, 322*b* include structure for providing a snap-fit connection between the housing pieces 322*a*, 322*b*. For example, the pieces 322*a*, 322*b* include resilient cantilever arms 332 that interlock with corresponding retaining shoulders 334. The cantilever arms 332 and the retaining shoulders 334 are positioned on opposite sides of each housing piece 322*a*, 322*b*. To mount the housing 320 on the bulkhead 300, the housing piece 322*a* is inserted downwardly over the housing mount 306 as shown by arrow 338, and the housing piece 322*b* is inserted upwardly over the housing mount 306 as indicated by arrow 340. As the housing pieces 322*a*, 322*b* are pressed together, the arms 332 flex outwardly and then snap into a locked position in abutment with shoulders 334. If it is desired to disconnect the housing pieces 322*a*, 322*b*, the cantilever arms 332 can be manually flexed in an outward direction thereby allowing the housing pieces 322*a*, 322*b* to be pulled apart. FIG. 9 shows the resilient cantilever arms 332 snapped into the locking position such that the housing pieces 322*a*, 322*b* are coupled about the bulkhead 300.

Figure 12:
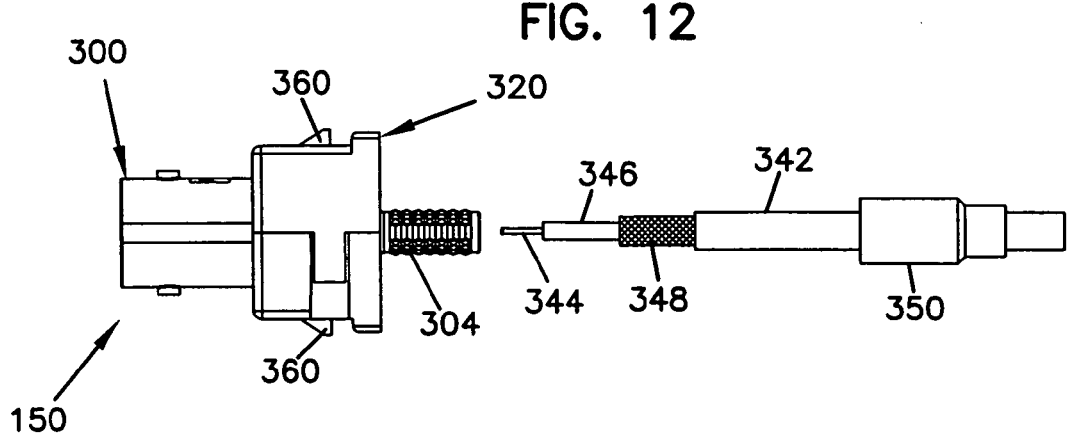
FIGS. 12–14 illustrate a sequence for terminating a cable to the connector of FIG. 9.

To terminate a cable 342 within the connector 150, the cable 342 is preferably stripped as shown in FIG. 12. In the stripped configuration, the cable 342 includes an exposed central wire 344, an exposed cladding portion 346, and an exposed reinforcing braid 348. The exposed wire 344 is preferably crimped within the center conductor 316. The center conductor 316 is positioned within the bulkhead 300 of the connector 150 as shown in FIG. 11. To mechanically secure the cable 342 to the connector 150, the braided portion 348 is inserted over the crimp supporting sleeve 304 of the bulkhead 300. A ferrule 350 is then crimped over the braid 348 to affix the braid 304 to the sleeve 304.

The housing 320 of the connector also preferably includes structure for providing a snap-fit connection between the connector 150 and the housing 122 of the jack module 120. For example, as shown in FIGS. 9 and 12–14, the housing 320 includes top and bottom resilient cantilever arms 360 (only the top cantilever arm is shown in FIG. 9). Each cantilever arm 360 includes first and second retaining tabs 362 and 364 that are separated by a gap 366. The second tab 364 is located at the free end of the arm 360, and the first tab 362 is located between the second tab 364 and the base end of the arm 360. The first tab 362 includes a ramp surface 368. The housing 320 also includes fixed retaining shoulders 370 located on opposite sides of each of the second tabs 364.

Figure 13:
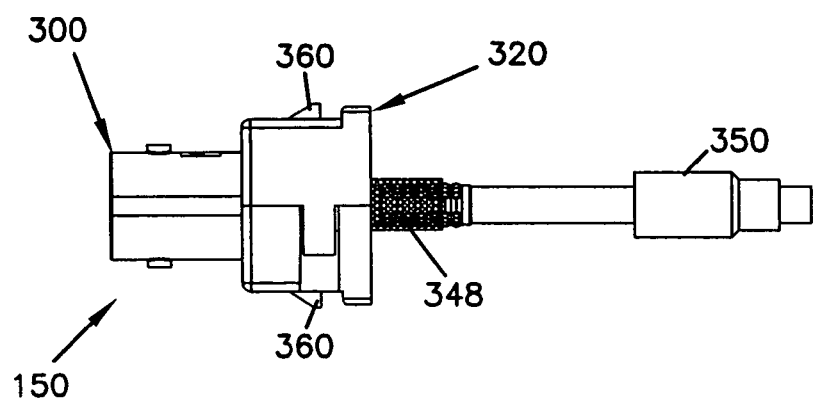
Figure 14:
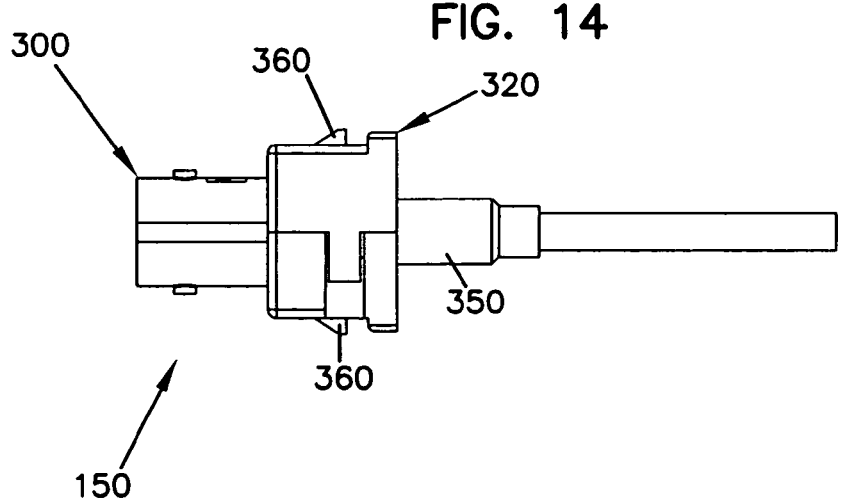

As shown in FIGS. 12–14, the top and bottom sides of the housing are shown having identical configurations. However, in other embodiments, different snap-fit configurations can be provided on the top and bottom sides of the connector. Further, in some embodiments, only one snap-fit structure may be provided. It will be appreciated that the snap-fit structure could be provided on the top, the bottom or either side of the housing 320. The rear connectors and alternative connectors are also disclosed in U.S. application Ser. No. 10/200,060 entitled Telecommunications Connector, which has attorney docket No. 2316.1365US01 and was filed on a date concurrent herewith, and which is hereby incorporated by reference in its entirety.

Referring to FIG. 2, the connectors 150 are connected to the rear wall 129 of the jack module 120 by inserting the housings rearwardly through the openings 196. As the connectors 150 are inserted rearwardly through the openings 196, the ramped surfaces 368 of the top and bottom tabs 362 contact top and bottom edges 365, 367 that define the openings 196. The contact between the ramped surfaces 368 and the top and bottom edges 365, 367 of the openings 196 causes the cantilever arms 360 to flex inwardly (i.e., toward one another). After the first tabs 362 have moved completely through the openings 196, the cantilever arms 360 snap outwardly (i.e., away from one another) such that the top and bottom edges 365, 367 are captured in the gap 366 between the first and second tabs 362, 364. As so positioned, the second tabs 364 as well as the fixed retaining shoulders 370 engage the front side of the rear wall 129, and the first tabs 362 engage the back side of the rear wall 129. By flexing the cantilever arms inwardly while pushing the connectors 150 in a forward direction, the connectors 150 can be removed from the openings 196.

The depicted connector embodiment is adapted to be snap-fit into the openings 196 by pushing the connector in a rearward direction. It will be appreciated that in other embodiments, the snap-fit configuration can be modified to allow the connectors to be inserted in a forward direction from the rear side of the jack module.

V. Pin Jack Housing

FIGS. 15 and 16 show the pin jack housing 158 in isolation from the remainder of the jack module 120. In a non-limiting embodiment, the pin jack housing 158 is made of a dielectric material such as molded plastic (e.g., polycarbonate). The pin jack housing is generally rectangular and includes a top side 424 positioned opposite from a bottom side 426. The pin jack housing 158 also includes a first end 420 positioned opposite from a second end 422. Two conductors 428 are mounted within the pin jack housing 158. Each conductor 428 includes a socket 430 accessible from the second end 422 of the housing 158, and a pin 432 that projects from the first end 420 of the housing 158. The sockets 428 are adapted to receive and provide an electrical connection with a pin of a tracer lamp cable.

Referring still to FIGS. 15 and 16, the housing 158 also includes structure for providing a snap-fit connection with the housing 122 of the jack module 120. For example, resilient cantilevers 434 are provided at the top and bottom sides 424, 426. The cantilevers 434 have base ends integrally formed with the top and bottom sides 424, 426, and free ends including first retaining tabs 436. The first retaining tabs 436 include ramp surfaces 438. Each cantilever arm 434 also includes a second retaining tab 440. The second retaining tabs 440 are separated from the first retaining tabs 436 by a gap 442. The second retaining tabs 440 are positioned in alignment with fixed stops 445 that project outwardly from the housing 158.

Referring to FIG. 2, the pin jack housing 158 is sized to be mounted in the opening 200 defined at the upper mounting location 146 of the rear wall 129 of the jack module 120. The pin jack housing 158 is mounted in the opening 200 by inserting the second end 422 of the pin jack housing 158 rearwardly through the opening 200. As the pin jack housing 158 is pressed through the opening 200, engagement between top and bottom edges of the opening and the ramped surfaces 438 of the first return tabs 436 causes the cantilever arms 434 to be flexed toward one another to allow the first tabs 436 to pass through the opening 200. Once the first tabs 436 pass through the opening 200, the cantilever arms 438 flex away from one another and "snap" into a locked position. In the locked position, the first tabs 436 engage the back side of the rear wall 129 and the second retaining tabs 440 engage or oppose the front side of the rear wall 129. Similarly, the fixed stops 444 also oppose the front side of the rear wall 129.

To remove the pin jack housing 158, the cantilever arms 434 can be flexed inwardly thereby allowing the housing 158 to be dislodged from the opening 200 by pushing the housing 158 in a forward direction. In other embodiments, the pin jack housing 158 can be configured to be inserted into the opening 200 from the rear end of the jack module 120.

As shown in FIGS. 15 and 16, the sides of the housing are shown having identical configurations. However, in other embodiments, different snap-fit configurations can be provided on the sides of the pin jack housing. Further, in some embodiments, only one snap-fit structure may be provided. It will be appreciated that the snap-fit structure could be provided on the top, the bottom or either side of the housing. The pin jack housing and alternative housings are also disclosed in U.S. application Ser. No. 10/199,984 entitled Pin Jack for a Digital Switching Cross-Connect Module, which was filed on a date concurrent herewith, and which is hereby incorporated by reference in its entirety.

VI. The Card Edge Connector

Figure 17:
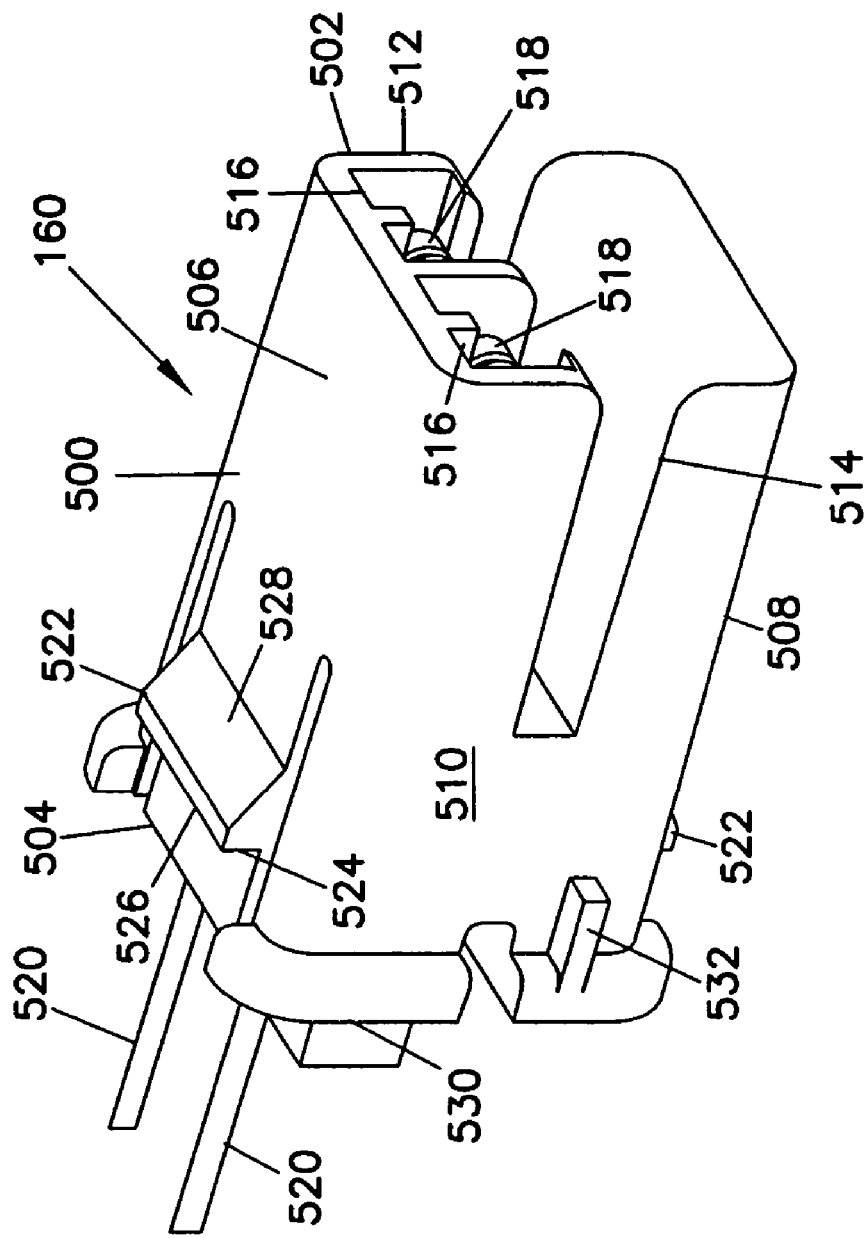
FIG. 17 is a perspective view of a power connector of the jack module of FIG. 2.

Referring to FIG. 17, the card edge connector 160 is shown in isolation from the jack module 120. The card edge connector 160 includes a housing 500 having a first end 502 positioned opposite from a second end 504. The housing 500 also includes a top side 506 positioned opposite from a bottom side 508, and a left side 510 positioned opposite from a right side 512. The sides 506, 508, 510 and 512 extend between the first and second ends 502 and 504. In a non-limiting embodiment, the housing 500 is made of a dielectric material (e.g., a plastic material such as polycarbonate).

Referring still to FIG. 17, the first end 502 of the housing 500 defines an open ended slot 514 adapted for receiving a card edge. Two channels 516 are positioned above the slot 514. The channels 516 extend between the first and second ends 502, 504 and have open bottoms. Contact springs 518 are mounted within the channels 516. The springs are adapted for contacting ground and power contacts of a card inserted within the channel 516. The springs 518 are electrically connected to conductive pins 520 that project from the second end 504 of the housing 500.

The housing 500 preferably includes structure for providing a snap fit connection with the housing 122 of the jack module 120. For example, the housing 500 includes top and bottom cantilever arms 522. The cantilever arms 522 have base ends that are shown integrally formed with the housing 500. Retaining tabs 524 are provided on the flexible cantilever arms 522. The retaining tabs include retaining surfaces 526 and ramp surfaces 528. The retaining surfaces 526 face toward a stop flange 530 located adjacent the second end 504 of the housing 500. The housing 500 also includes an index member 532 that projects from the left side 510 of the housing 500.

Referring to FIG. 2, the card edge connector 160 is sized to be mounted in the opening 198 defined at the lower mounting location 148 of the rear wall 129 of the jack module 120. The card edge connector 160 is mounted in the opening 198 by inserting the first end 502 of the housing 500 rearwardly through the opening 198. As the housing 500 is pressed through the opening 198, engagement between top and bottom edges of the opening 198 and the ramped surfaces 528 of the tabs 524 causes the cantilever arms 522 to be flexed toward one another to allow the tabs 526 to pass through the opening 198. Once the tabs 424 pass through the opening 198, the cantilever arms 522 flex away from one another and "snap" into a locked position. In the locked position, the retaining surfaces 526 of the tabs 524 engage at the back side of the rear wall 129 and the retaining flange 530 engages the front side of the rear wall 129. As so inserted, the index member 532 fits within a corresponding notch 534 of the opening 198 to ensure the card edge connector 160 is inserted in the proper orientation.

To remove the card edge connector 160, the cantilever arms 522 can be flexed toward one another thereby allowing the housing 500 to be removed from the opening 198 by pushing the housing 500 in a forward direction. In other embodiments, the card edge connector 160 can be configured to be inserted into the opening 198 from the rear end of the jack module 120. It will be appreciated that in other embodiments, the snap fit configuration of the housing 500 can be varied from the configuration specifically depicted.

VII. Tracer Lamp Circuitry

Figure 18:
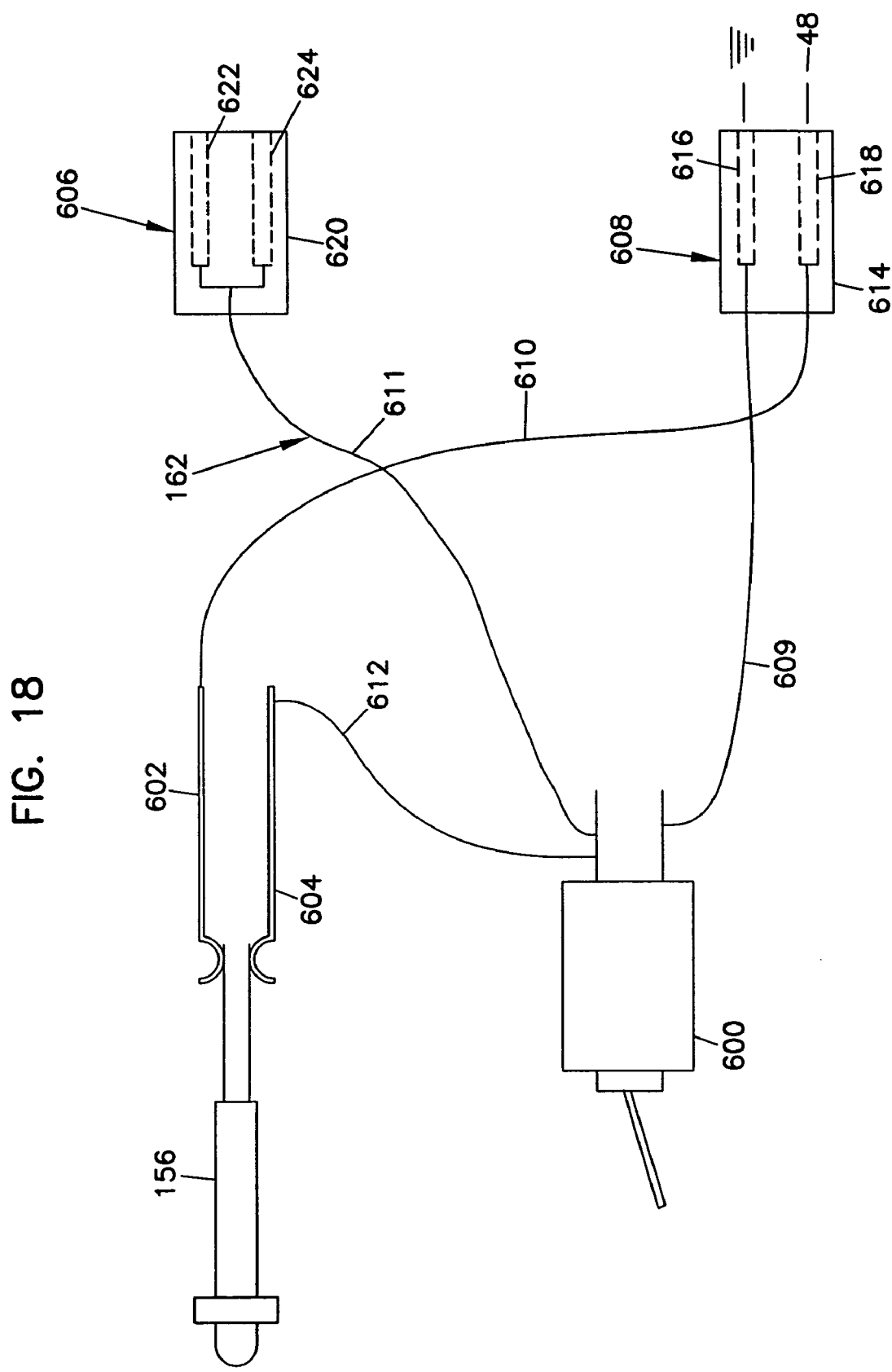
FIG. 18 is a schematic depiction of a tracer lamp circuit of the jack module of FIG. 2.

FIG. 18 schematically shows the tracer lamp circuit of the jack module 120. The circuit includes LED 156, contact springs 602, 604 and switch 600 that mount to the front jack mount 130 of the jack module 120. The circuit 154 also includes harness 162 including connectors 606 and 608 as well as leads 609–612.

Connector 608 includes a dielectric body 614. Sockets 616 and 618 are provided within the housing 614. The sockets 616, 618 include electrically conductive elements adapted to make electrical contact with the pins 520 of the card edge connector 160 when the pins are inserted within the sockets 616, 618. The socket 616 is electrically connected to switch 600 by lead 609. Socket 618 is electrically connected to spring contact 602 by lead 610. The term "socket" includes any structure for receiving and making electrical contact with a pin or plug.

Connector 606 includes a dielectric housing 620. Sockets 622 and 624 are provided within the housing. The sockets include electrically conductive elements. The conductive element of the socket 624 is electrically connected to the spring contact 604 by lead 611. The sockets 622 and 624 are configured to receive and make electrical contact with the pins 432 of the pin jack housing 158. It will be appreciated that the socket 622 is electrically coupled to the socket 624 such that both sockets 622, 624 are electrically connected to the tracer lamp circuit via lead 611.

Referring to FIG. 2, the tracer lamp circuit is shown within the jack module 120. As depicted, the contact springs 602 and 604 are pressed within the front jack mount 130 on opposite sides of a dielectric spacer 630. Preferably, LED 156 is pressed within a port defined by the front jack mount 130, and as so inserted makes electrical contact with both spring contacts 602 and 604. Lead 612 is provided for electrically connecting the spring 604 to the switch 600. Once the switch 600, LED 156 and spring contacts 602 and 604 are mounted to the front jack mount 130, connector 606 is preferably electrically connected to the pin jack housing 158 by inserting the pins 432 of the pin jack housing 158 into the sockets 622 and 624 of the connector 606. Similarly, the connector 608 is electrically connected to the card edge connector 160 by inserting the pins 520 of the card edge connector into the sockets 616 and 618. In a preferred embodiment, friction between the pins and the sockets holds the connectors 606 and 608 in the connected orientation. The connectors 606, 608 are preferably "push-in-place" connectors. The term "push-in-place" connectors means the connectors provide a connection by merely pushing the connectors over corresponding conductive elements (e.g., pins) without requiring wire wrapping or soldering.

VIII. Assembly of Jack Module

It will be appreciated that the jack module 120 can be assembled in a number of different ways, and in a number of different sequences. It will also be appreciated that the sequence of assembly steps described herein are merely an example of one type of assembly sequence that can be utilized, and that the sequence of steps can be varied.

To assemble the jack module 120, the ends of the cables 152 are preferably initially terminated to the connectors 140 and 150. Additionally, the leads 609–611 of the harness 162 are terminated to their respective components of the tracer lamp circuit 154. The spring contacts 602, 604 and the switch 600 can then be mounted to the front jack mount 130. After mounting the springs 602 and 604 in place, the LED 156 can be inserted between the springs 602 and 604. Thereafter, the connector 606 can be electrically connected to the pin jack housing 158 and the connector 608 can be electrically connected to the card edge connector 160. The pin jack housing 158 and the card edge connector 160 can then be snap fit within their respective openings 200 and 198 defined by the rear wall 129 of the jack module 120.

To continue the assembly process, the front jack mount 130 can be fastened to the main frame 124 of the jack module. Thereafter, the connectors 140 (which were pre-terminated to cables 150) can be press fit within their corresponding connector mounts 138, and the rear connectors 150 (which were pre-terminated to cables 150) can be snap fit within their corresponding openings 196 defined by the rear wall 129 of the jack module 120.

To complete the assembly, the jack devices 134a, 134b can be snap fit within the front cover 144. After snap fitting the jack devices 134a, 134b to the cover 144, the cover 144 is maneuvered to insert the jack devices 134a, 134b into their respective pockets 132a, 132b. The assembly is pressed rearwardly until the connectors 142 of the jack devices 134a, 134b make electrical connections with their corresponding connectors 140. The front cover 144 is then fastened to the front jack mount 130.

The module disclosed herein is adapted for use in a coaxial system. Therefore, the various connectors and ports are adapted for use with coaxial connectors and plugs. However, it will be appreciated that the various inventive aspects are applicable to other types of connector configurations as well. Further, while all of the connectors are shown including snap-fit connections, in alternative embodiments, other type of connections can be used for some or all of the connectors. It will be appreciated that many embodiments of the inventions can be made without departing from the spirit and scope of the inventions.

We claim:

1. A cross-connect module comprising:

a module housing having a front end and a rear end, the rear end including a rear wall defining connector mounting openings;

co-axial connectors secured within the connector mounting openings of the rear wall by snap-fit connections, the co-axial connectors including an X-IN connector, an X-OUT connector, an IN connector and an OUT connector;

first and second ports located at the front end of the module housing;

a first switch assembly positioned adjacent the first port, the first switch assembly being connected to the X-IN connector by a first cable and to the IN connector by a second cable, the first switch assembly providing a normal-through signal path between the X-IN connector and the IN connector when no plug is present in the first port, and the first switch assembly disconnecting the normal through-signal path between the X-IN connector and the IN connector when a plug is inserted in the first port; and a second switch assembly positioned adjacent the second port, the second switch assembly being connected to the X-OUT connector by a third cable and to the OUT connector by a fourth cable, the second switch assembly providing a normal-through signal path between the X-OUT connector and the OUT connector when no plug is present in the second port, and the second switch assembly disconnecting the normal through-signal path between the X-OUT connector and the OUT connector when a plug is inserted in the second port.

2. The cross-connect module of claim 1, wherein each of the co-axial connectors includes a connector body including a connector sleeve containing a center conductor, and each of the co-axial connectors also includes a connector housing mounted over the connector body, each connector housing including at least one tab for providing the snap-fit connection with the rear wall of the module housing.

3. The cross-connect module of claim 2, wherein each of the connector housings includes at least one flexible cantilever at which the tab is provided.

4. The cross-connect module of claim 2, wherein each of the connector housings includes at least two flexible cantilevers having tabs for providing the snap-fit connection with the rear wall of the module housing.

5. The cross-connect module of claim 2, wherein the connector housings also include fixed retaining shoulders that cooperate with the tabs to provide the snap-fit connections.

6. The cross-connect module of claim 2, wherein each of the connector bodies includes a crimp-supporting sleeve co-axially aligned with the connector sleeve.

7. The cross-connect module of claim 6, wherein the connector bodies are made of die cast metal.

8. The cross-connect module of claim 6, wherein the housings are mounted between the connector sleeves and the crimp-supporting sleeves, and wherein the connector bodies include outwardly projecting members that fit within complementary shaped interior recesses defined within the connector housings.

9. A cross-connect system comprising:
   a frame having a front and a rear, the rear of the frame including a rear wall defining connector mounting openings;
   co-axial connectors secured within the connector mounting openings of the rear wall by snap-fit connections, the co-axial connectors including an X-IN connector, an X-OUT connector, an IN connector and an OUT connector;
   first and second ports located at the front of the frame;
   a first switch assembly positioned adjacent the first port, the first switch assembly being connected to the X-IN connector by a first cable and to the IN connector by a second cable, the first switch assembly providing a normal-through signal path between the X-IN connector and the IN connector when no plug is present in the first port, and the first switch assembly disconnecting the normal through-signal path between the X-IN connector and the IN connector when a plug is inserted in the first port; and
   a second switch assembly positioned adjacent the second port, the second switch assembly being connected to the X-OUT connector by a third cable and to the OUT connector by a fourth cable, the second switch assembly providing a normal-through signal path between the X-OUT connector and the OUT connector when no plug is present in the second port, and the second switch assembly disconnecting the normal through-signal path between the X-OUT connector and the OUT connector when a plug is inserted in the second port.

10. The cross-connect system of claim 9, wherein each of the co-axial connectors includes a connector body including a connector sleeve containing a center conductor, and each of the co-axial connectors also includes a connector housing mounted over the connector body, each connector housing including at least one tab for providing the snap-fit connection with the rear wall of the frame.

11. The cross-connect system of claim 10, wherein each of the connector housings includes at least one flexible cantilever at which the tab is provided.

12. The cross-connect system of claim 10, wherein each of the connector housings includes at least two flexible cantilevers having tabs for providing the snap-fit connection with the rear wall of the frame.

13. The cross-connect system of claim 10, wherein the connector housings also include fixed retaining shoulders that cooperate with the tabs to provide the snap-fit connections.

14. The cross-connect system of claim 10, wherein each of the connector bodies includes a crimp-supporting sleeve co-axially aligned with the connector sleeve.

15. The cross-connect system of claim 14, wherein the connector bodies are made of die cast metal.

16. The cross-connect system of claim 14, wherein the housings are mounted between the connector sleeves and the crimp-supporting sleeves, and wherein the connector bodies include outwardly projecting members that fit within complementary shaped interior recesses defined within the connector housings.

* * * * *